United States Patent
Darabi (10) Patent No.: US 8,107,908 B2
(45) Date of Patent: Jan. 31, 2012

(54) SELECTIVE FAST IMAGE REJECTION

(75) Inventor: Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 880 days.

(21) Appl. No.: 12/028,464

(22) Filed: Feb. 8, 2008

(65) Prior Publication Data

US 2009/0203338 A1    Aug. 13, 2009

(51) Int. Cl.
H04B 17/00    (2006.01)
H04B 17/02    (2006.01)
H04B 1/26    (2006.01)

(52) U.S. Cl. .................. 455/226.1; 455/67.11; 455/134; 455/226.2; 455/313

(58) Field of Classification Search ................ 455/67.11, 455/67.13, 132–134, 140, 226.1–226.4
See application file for complete search history.

(56) References Cited

U.S. PATENT DOCUMENTS

| | | | | |
|---|---|---|---|---|
| 6,018,651 A * | 1/2000 | Bruckert et al. | ........... | 455/277.1 |
| 6,330,429 B1 * | 12/2001 | He | ............... | 455/67.11 |
| 6,571,090 B1 * | 5/2003 | Moriyama et al. | ......... | 455/277.1 |
| 6,603,961 B1 * | 8/2003 | Kuroda | ........................... | 455/133 |
| 6,810,266 B1 * | 10/2004 | Ecklund et al. | ............. | 455/553.1 |
| 7,149,480 B2 * | 12/2006 | Miyahara | ........................ | 455/78 |
| 7,330,707 B2 * | 2/2008 | Okanobu | ....................... | 455/140 |
| 7,486,942 B2 * | 2/2009 | Sakurai | .......................... | 455/314 |
| 7,593,491 B1 * | 9/2009 | Khlat et al. | .................... | 375/344 |
| 7,801,018 B2 * | 9/2010 | Okuhata et al. | ............... | 370/208 |
| 7,904,042 B2 * | 3/2011 | Darabi | ........................ | 455/226.2 |
| 2003/0181211 A1 * | 9/2003 | Razavilar et al. | ............. | 455/450 |
| 2007/0042734 A1 * | 2/2007 | Ryu et al. | .................... | 455/182.3 |
| 2007/0184801 A1 * | 8/2007 | Kogawa et al. | ............ | 455/277.1 |
| 2008/0045175 A1 * | 2/2008 | Yoon et al. | .................. | 455/188.1 |

* cited by examiner

Primary Examiner — Simon Nguyen
(74) Attorney, Agent, or Firm — Garlick Harrison & Markison; Shayne X. Short (57) ABSTRACT

Selective fast image rejection. Selective down conversion processing is performed on a received signal based on the signal strength of that received signal. As few as two possible down conversion frequencies can be employed so that the received signal is down converted either to a first down converted signal having a first intermediate frequency or to a second down converted signal having a second intermediate frequency. If desired, the received signal can either be down converted using low side injection or high side injection down conversion processing. Alternatively, a larger number of possible down conversion frequencies so that the received signal is down converted to one of the possible down conversion frequencies based on the signal strength of the received signal.

20 Claims, 9 Drawing Sheets

SELECTIVE FAST IMAGE REJECTION

CROSS REFERENCE TO RELATED PATENTS/PATENT APPLICATIONS

Incorporation by Reference

The following related U.S. Utility Patent Application, being filed concurrently, is hereby incorporated herein by reference in its entirety and is made part of the present U.S. Utility Patent Application for all purposes:

1. U.S. Utility patent application Ser. No. 12/028,436, entitled "Selective fast image rejection," filed Feb. 8, 2008, pending.

BACKGROUND OF THE INVENTION

1. Technical Field of the Invention

The invention relates generally to communication systems; and, more particularly, it relates to processing of signals received by communication devices within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

The frequency to which a received signal is down converted in such an IF stage largely affect certain characteristics of the down converted signal. For example, when down converting the received signal to a higher IF can help alleviate or at least reduce some of the problems generally associated with lower down conversion frequencies (e.g., flicker, DC offset, etc.). However, with respect to other issues, such as image rejection, a relatively higher IF can be more desirable and beneficial. As can be seen, the frequency to which a received signal is down converted can significantly affect many subsequent issues including the properties of the signal at the IF and/or a subsequent baseband signal generated from the IF signal.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

A means is presented herein by which selective down conversion processing is performed on a received signal based on the signal strength of that received signal. As few as two possible down conversion frequencies can be employed so that the received signal is down converted either to a first down converted signal having a first intermediate frequency or to a second down converted signal having a second intermediate frequency. As another example, the received signal can either be down converted using low side injection or high side injection down conversion processing.

Alternatively, a larger number of possible down conversion frequencies so that the received signal is down converted to one of the possible down conversion frequencies based on the signal strength of the received signal.

Figure 1:
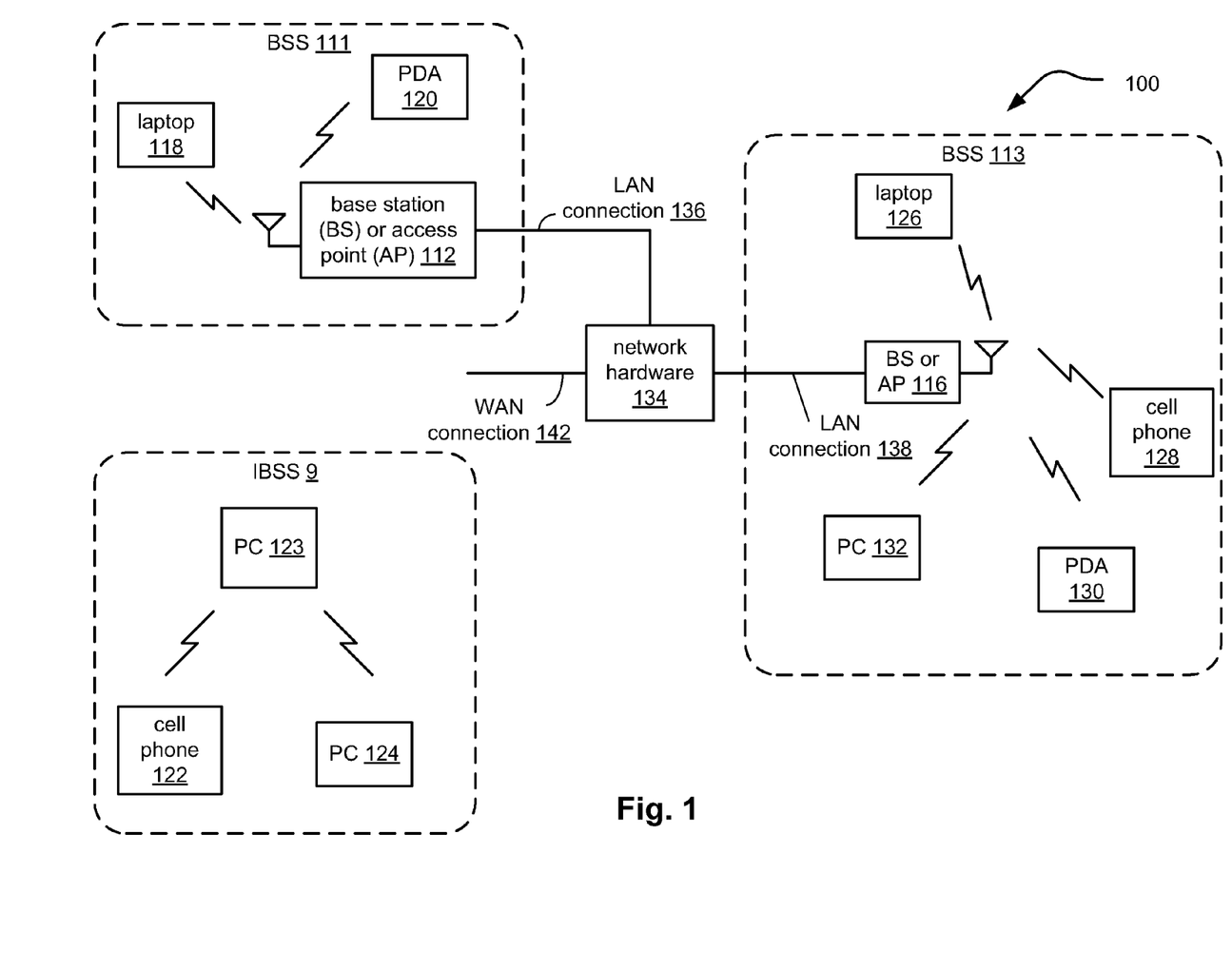
FIG. 1 is a diagram illustrating an embodiment of a wireless communication system.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, et cetera, provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
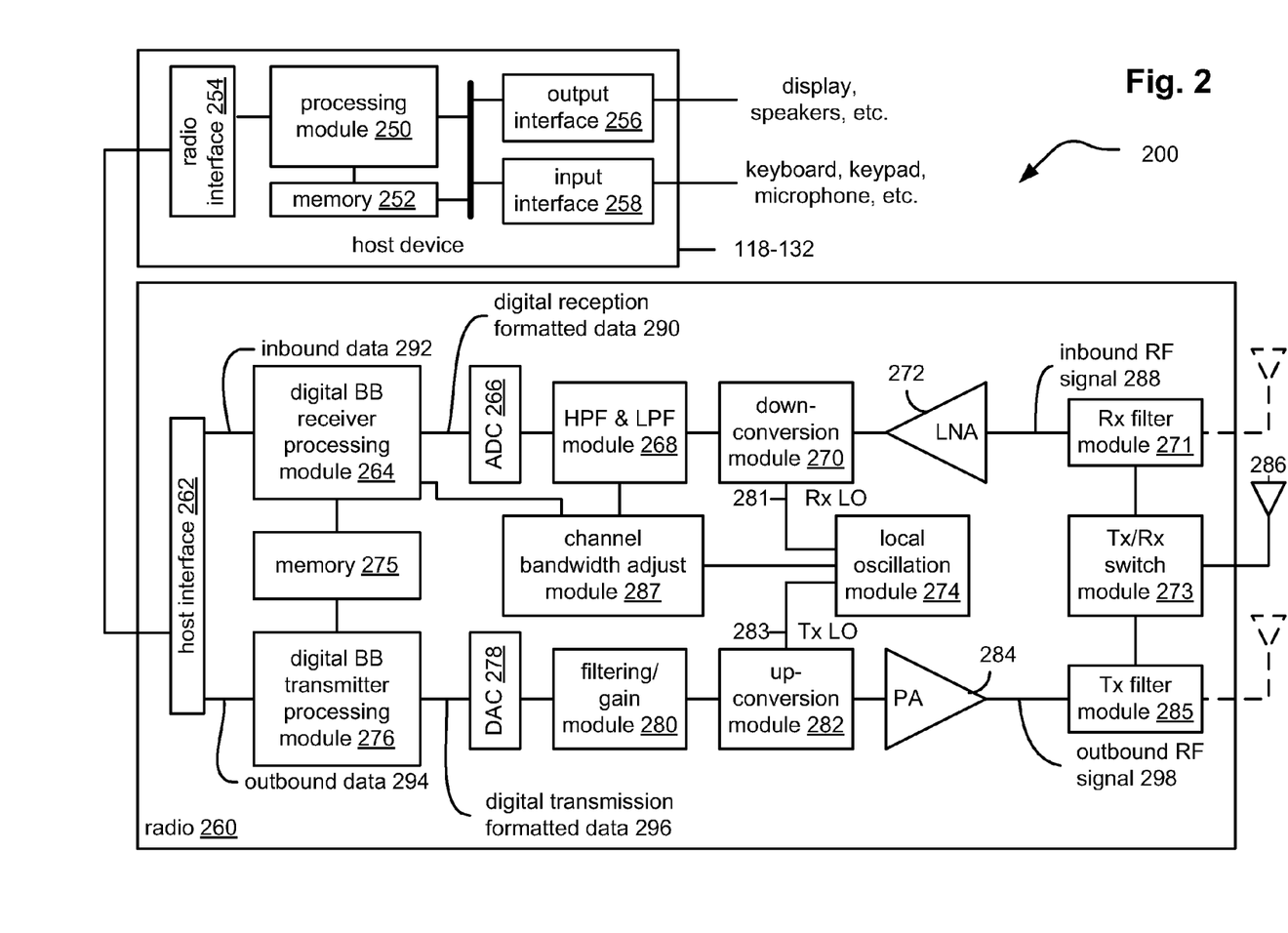
FIG. 2 is a diagram illustrating an embodiment of a wireless communication device.

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera, such that the received data may be displayed. The radio interface 254 also provides data from the processing module 250 to the radio 260. The processing module 250 may receive the outbound data from an input device such as a keyboard, keypad, microphone, et cetera, via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Figure 3A:
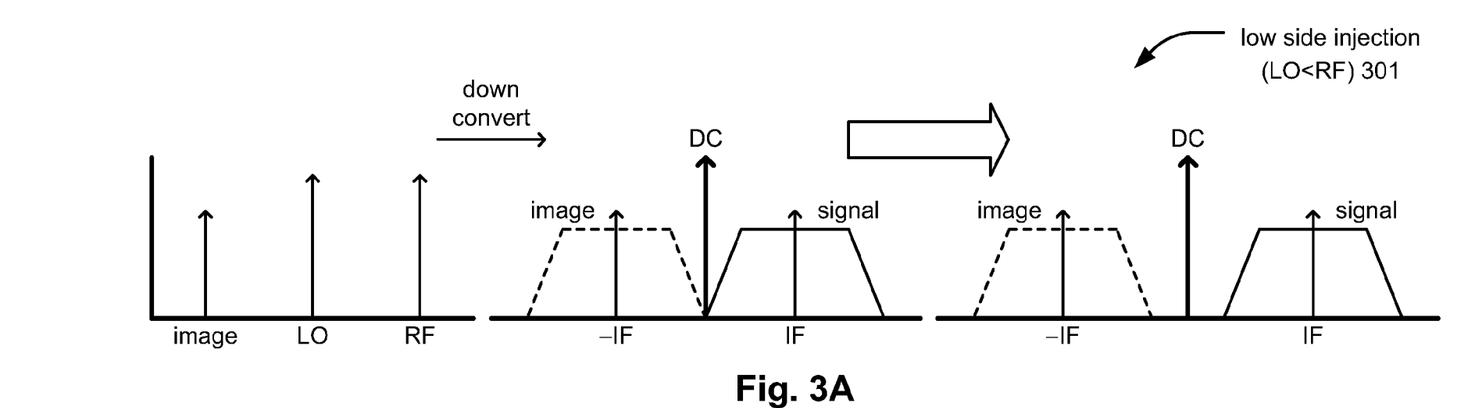
FIG. 3A is a diagram illustrating an embodiment of low side injection when performing down conversion of a received signal.

FIG. 3A is a diagram illustrating an embodiment of low side injection 301 when performing down conversion of a received signal. In this embodiment, a local oscillator (LO) has a frequency that is relatively lower than a radio frequency (RF) of a received signal. Based on this relationship of the LO frequency being relatively lower than the RF, an image generated during down conversion processing will occur in the frequency domain at a location having a negative of the intermediate frequency (IF) of the main signal component. If desired, additional filtering processing can be performed to ensure that no low frequency components of the signal and/or image exist. Alternatively, the IF of the down converted signal can be slightly moved as well.

Figure 3B:
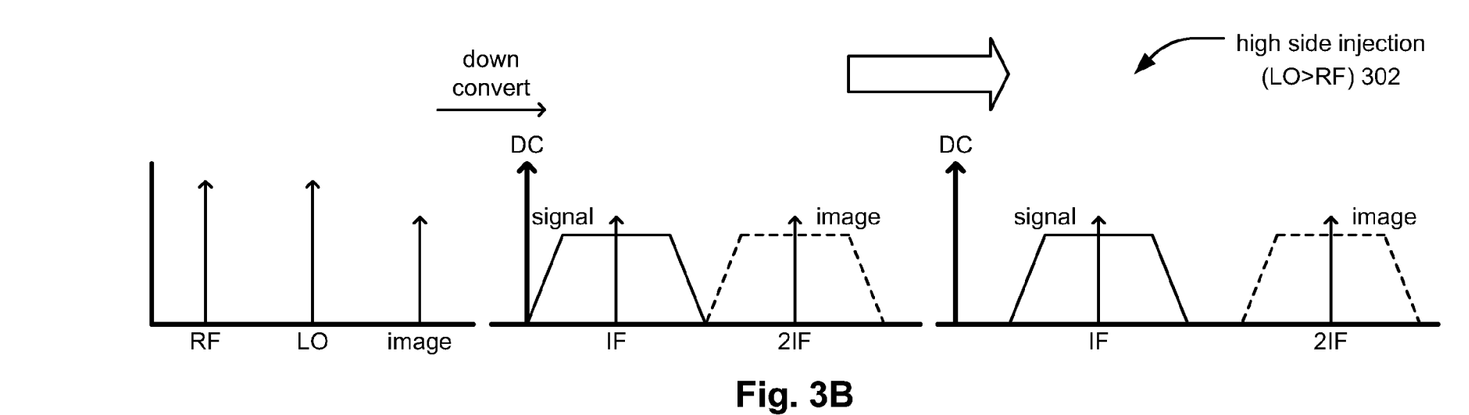
FIG. 3B is a diagram illustrating an embodiment of high side injection when performing down conversion of a received signal.

FIG. 3B is a diagram illustrating an embodiment of high side injection 302 when performing down conversion of a received signal. In this embodiment, a local oscillator (LO) has a frequency that is relatively higher than a radio frequency (RF) of a received signal. Based on this relationship of the LO frequency being relatively higher than the RF, an image generated during down conversion processing will occur in the frequency domain at a location having a higher frequency of the intermediate frequency (IF) of the main signal component. As with the previous embodiment, if desired, additional filtering processing can be performed to ensure that no low frequency components of the signal and/or image exist. Alternatively, the IF of the down converted signal can be slightly moved as well.

Figure 4:
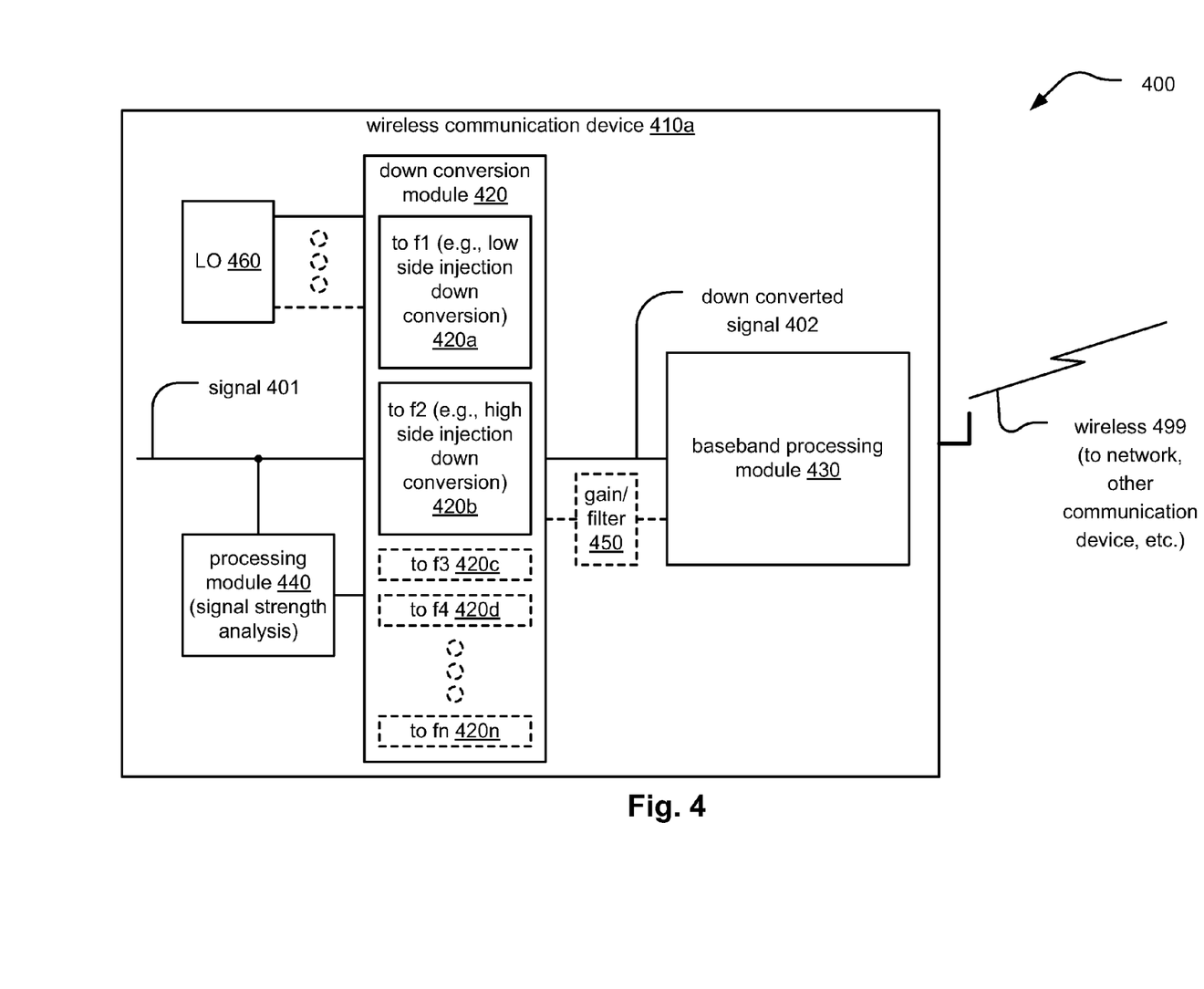
FIG. 4 is a diagram illustrating an alternative embodiment of a wireless communication system including a wireless communication device.

FIG. 4 is a diagram illustrating an alternative embodiment of a wireless communication system 400 including a wireless communication device. The wireless communication system 400 includes a wireless communication device 410a. In some embodiments (e.g., as shown in this diagram), one or more of the modules within the wireless communication device 410a can be implemented within a single integrated circuit. Alternatively, in other embodiments, certain of the various modules can be implemented on a certain number of separate integrated circuit.

The wireless communication device 410a can communicate via a wireless communication channel 499 to a communication network and/or one or more other communication devices. A wireless signal is received by the wireless communication device 410a from the wireless communication channel 499. This wireless signal can undergo a degree of pre-processing (e.g., filtering, gain adjustment, etc.) before providing a signal 401 to a down conversion module 420.

The signal 401 is provided to a processing module 440 and also to a down conversion module 420. The processing module 440 operates to determine a signal strength of the signal 401. Then, depending on that determination of the signal strength of the signal 401, the down conversion module 420 processes the signal thereby generating a down converted signal having an intermediate frequency (IF) that is selected based on the signal strength of the signal 401.

The down conversion module 420 may be implemented to perform down conversion to any one of a number of different frequencies. For example, as shown by reference numeral 420a, down conversion may be performed to a frequency f1 in accordance with low side injection down conversion. As shown by reference numeral 420b, down conversion may be performed to a frequency f2 in accordance with high side injection down conversion. The selection of which frequency should be employed for down conversion processing can be made in an effort to deal with certain issues and concerns such as flicker, DC offset, image rejection, etc.

In addition, other frequencies may be employed to perform the selection down conversion processing. As shown by reference numeral 420c, down conversion may be performed to a frequency f3; as shown by reference numeral 420d, down conversion may be performed to a frequency f4; and so on until as shown by reference numeral 420n, down conversion may be performed to a frequency fn. A local oscillator (LO) 460 can be implemented to generate one or more LO signals to assist in the down conversion processing.

The down converted signal (e.g., having the selected intermediate frequency) is provided to a baseband processing module 430, as shown by reference numeral 402. If desired, additional processing (e.g., gain adjustment, filtering, etc. as performed in a module 450) can also be performed on the signal that is provided to the baseband processing module 430.

If desired, at start-up or upon some reset type event, a default selection of one of the down conversion frequencies (e.g., f1) can be selected so that the baseband processing module 430 initially gets a down converted signal 402 having a predetermined frequency. Thereafter, based on signal strength analysis within the processing module 440, another down conversion frequency can be employed.

Figure 5:
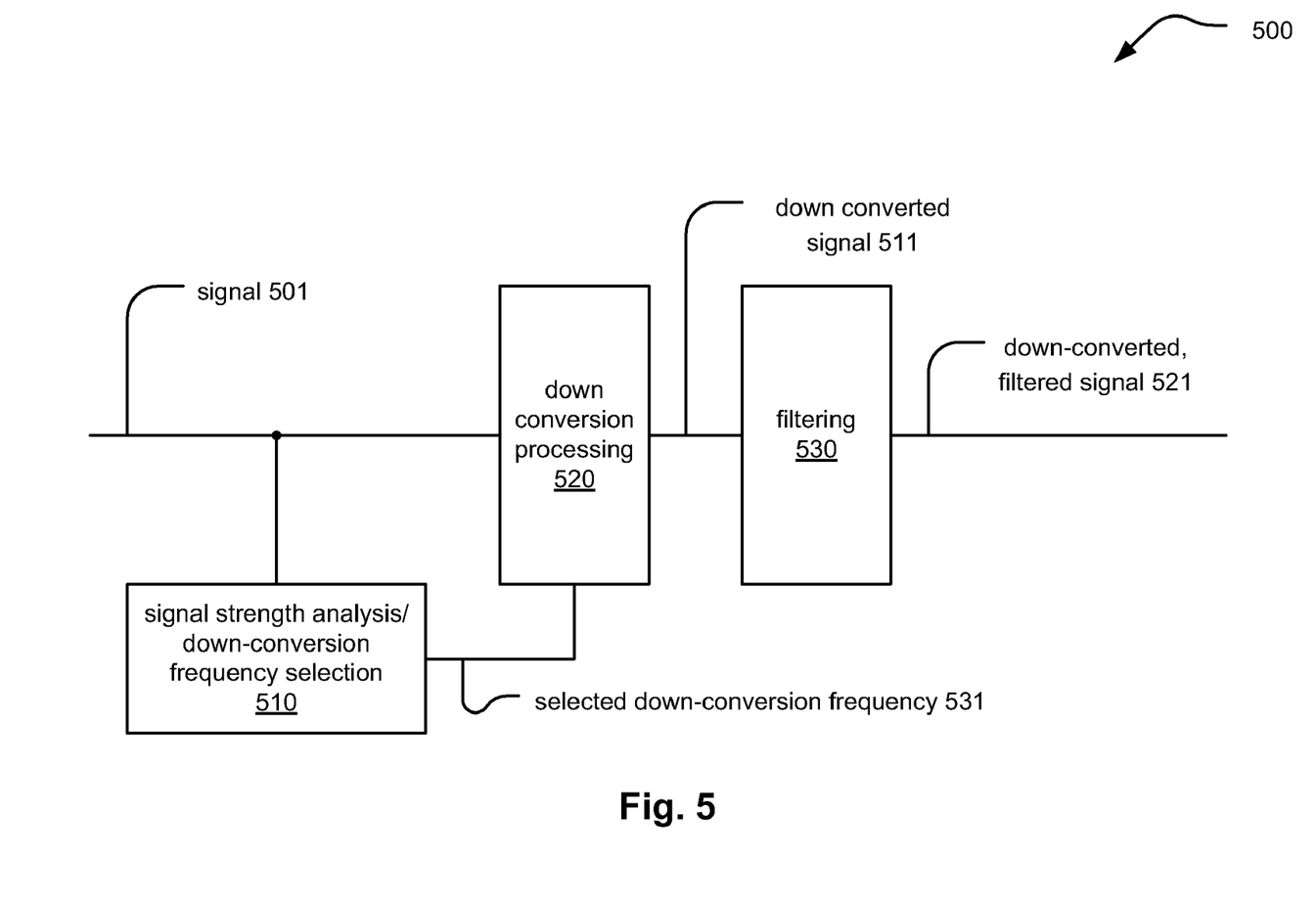
FIG. 5 is a diagram illustrating an embodiment of frequency selective down conversion processing.

FIG. 5 is a diagram illustrating an embodiment 500 of frequency selective down conversion processing. A signal 501 is provided for signal strength analysis and down conversion frequency selection, as shown by reference numeral 510. Based on the signal strength analysis, a selected down conversion frequency 531 directs the frequency to which the signal 501 is down converted, as shown by reference numeral 520. A down converted signal 511 is then generated which may undergo subsequent filtering, as shown in reference numeral 530, thereby generating a down converted, filtered signal 521.

FIG. 6A, FIG. 6B, FIG. 6C, and FIG. 6D are diagrams illustrating various embodiment of frequency selective down conversion processing.

Figure 6A:
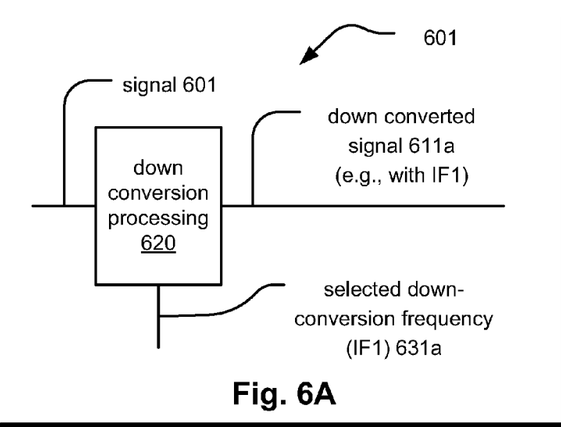
FIG. 6A, FIG. 6B, FIG. 6C, and FIG. 6D are diagrams illustrating various embodiment of frequency selective down conversion processing.

Referring to embodiment 601 of FIG. 6A, a signal 601 undergoes down conversion processing, as shown by reference numeral 620, based on a selected down conversion frequency of IF1, as shown by reference numeral 631a, to generate a down converted signal 611a. The down converted signal 611a then has the selected down conversion frequency of IF1.

Figure 6B:
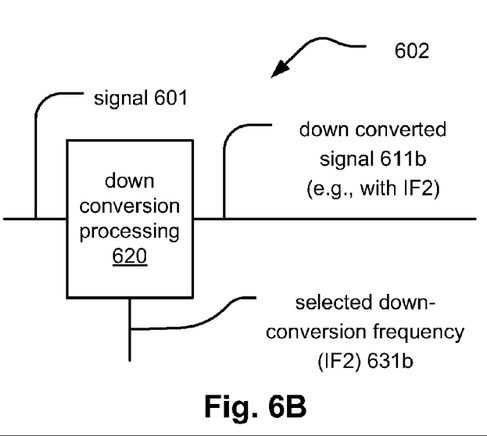

Referring to embodiment 602 of FIG. 6B, a signal 601 undergoes down conversion processing, as shown by reference numeral 620, based on a selected down conversion frequency of IF2, as shown by reference numeral 631b, to generate a down converted signal 611b. The down converted signal 611b then has the selected down conversion frequency of IF2.

Figure 6C:
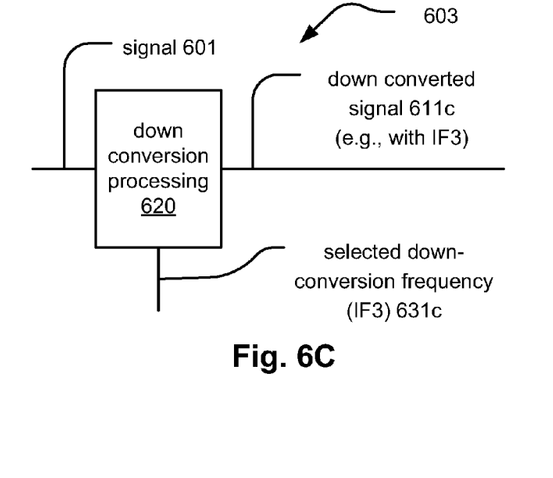

Referring to embodiment 603 of FIG. 6C, a signal 601 undergoes down conversion processing, as shown by reference numeral 620, based on a selected down conversion frequency of IF3, as shown by reference numeral 631c, to generate a down converted signal 611c. The down converted signal 611c then has the selected down conversion frequency of IF3.

Figure 6D:
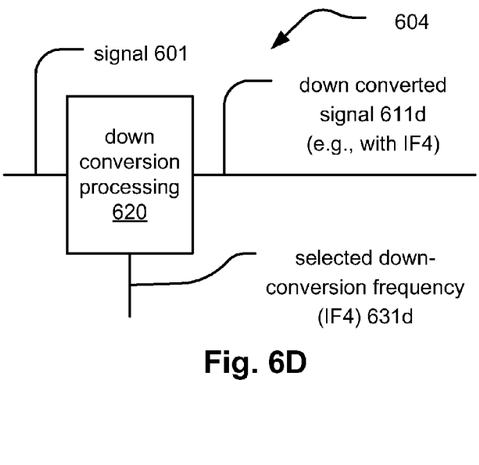

Referring to embodiment 604 of FIG. 6D, a signal 601 undergoes down conversion processing, as shown by reference numeral 620, based on a selected down conversion frequency of IF4, as shown by reference numeral 631d, to generate a down converted signal 611d. The down converted signal 611d then has the selected down conversion frequency of IF4.

As can be seen in these various embodiments, a single down conversion processing module can be employed to perform down conversion of a received signal to generate another signal that can have one of any number of frequencies (e.g., selected from a number of possible frequencies).

Figure 7:
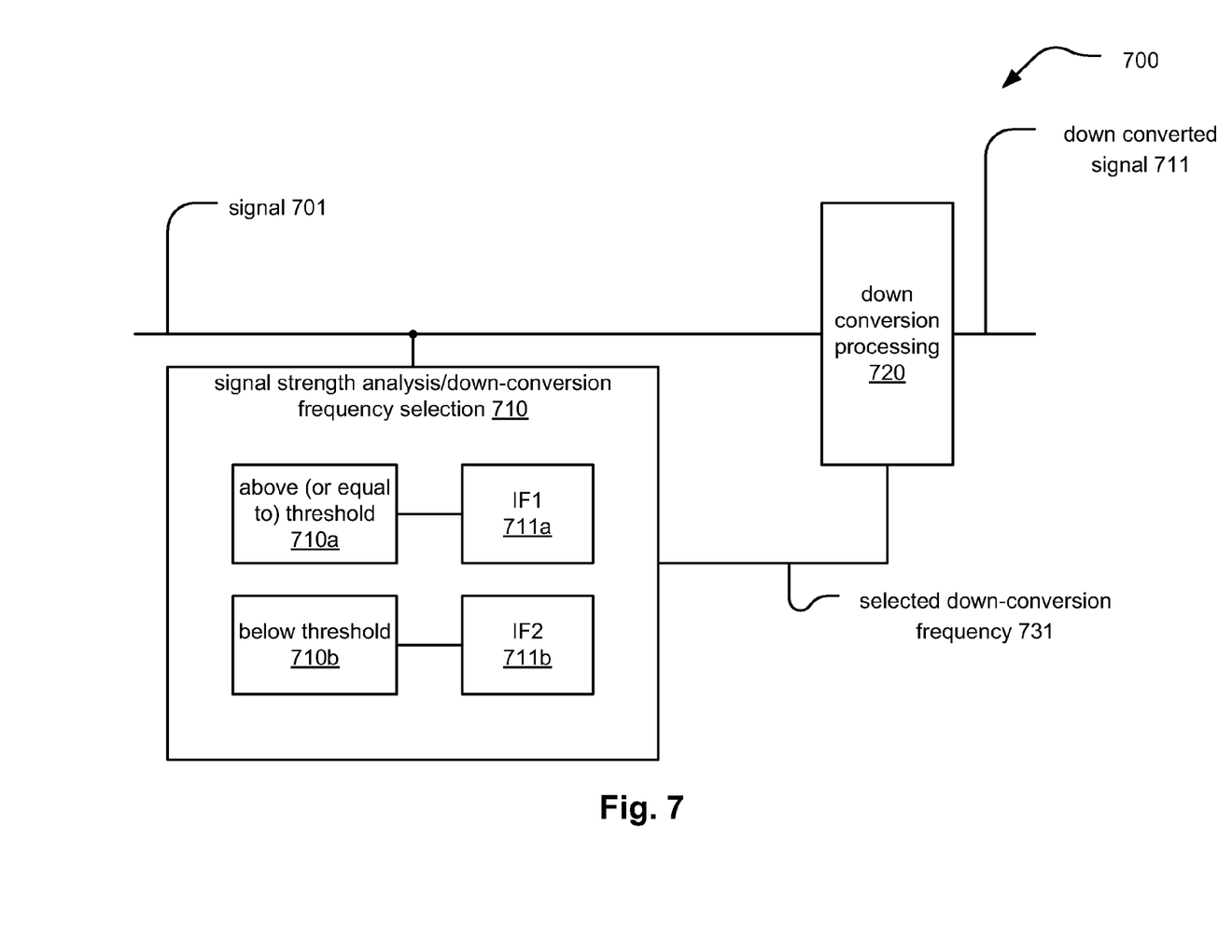
FIG. 7 and FIG. 8 are diagrams illustrating additional embodiments of frequency selective down conversion processing.
Figure 8:
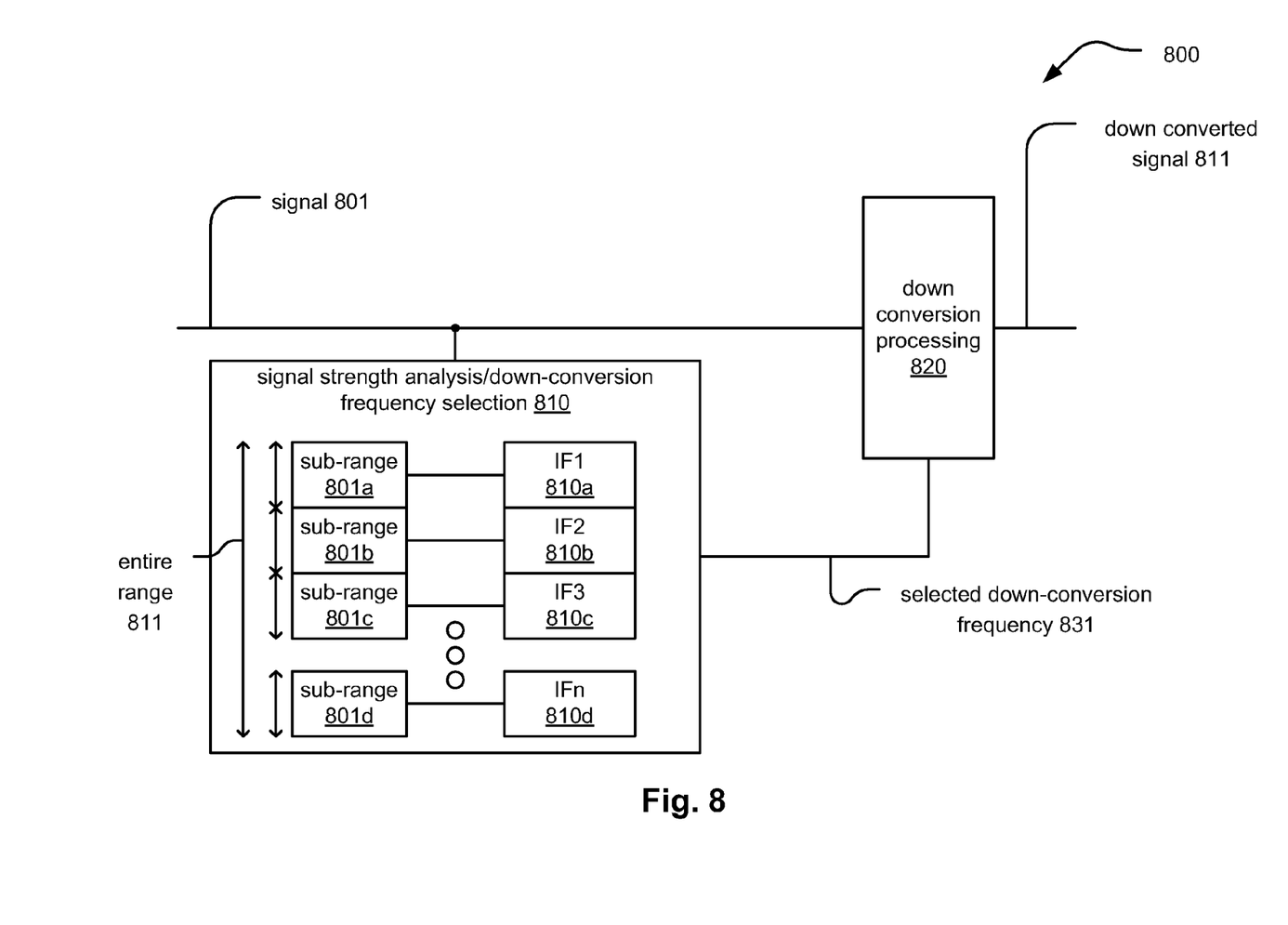

FIG. 7 and FIG. 8 are diagrams illustrating additional embodiments of frequency selective down conversion processing.

Referring to embodiment 700 of FIG. 7, a signal 701 is provided for signal strength analysis and down conversion frequency selection, as shown by reference numeral 710. Based on the signal strength analysis, a selected down conversion frequency 731 directs the frequency to which the signal 701 is down converted, as shown by reference numeral 720. A down converted signal 711 is then generated which may undergo subsequent processing including filtering, gain adjustment, etc.

In this embodiment, there are only two possible frequencies to which the signal 701 may be down converted. If the signal strength is above (or equal to) a threshold, as shown in a block 710a, then the selected frequency is a first frequency (IF1), as shown by reference numeral 711a. Alternatively, if the signal strength is below the threshold, as shown in a block 710b, then the selected frequency is a second frequency (IF2), as shown by reference numeral 711b. In some embodiments, either one of high side injection down conversion or low side injection down conversion may be selected for the manner of down conversion based on the signal strength being above/below some threshold as shown in this embodiment.

Referring to embodiment 800 of FIG. 8, a signal 801 is provided for signal strength analysis and down conversion frequency selection, as shown by reference numeral 810. Based on the signal strength analysis, a selected down conversion frequency 831 directs the frequency to which the signal 801 is down converted, as shown by reference numeral 820. A down converted signal 811 is then generated which may undergo subsequent processing including filtering, gain adjustment, etc.

In this embodiment, there is a plurality of possible frequencies to which the signal 801 may be down converted. An entire range 811 of possible signal strengths is partitioned into a plurality of sub-ranges 801a, 801b, 801c, and so on until 801d. If the signal strength lies within a particular range, then a corresponding selected frequency is selected as the selected down conversion frequency 831 to which the signal 801 is down converted in block 820.

For example, if the signal strength of signal 801 lies within sub-range 801a, then the selected frequency is a first frequency (IF1), as shown by reference numeral 810a. If the signal strength of signal 801 lies within sub-range 801b, then the selected frequency is a second frequency (IF2), as shown by reference numeral 810b. If the signal strength of signal 801 lies within sub-range 801c, then the selected frequency is a third frequency (IF3), as shown by reference numeral 810c. The entire range 811 can be partitioned into any desired number of sub-ranges. For example, if the signal strength of signal 801 lies within sub-range 801d, then the selected frequency is an n-th frequency (IFn), as shown by reference numeral 810d.

Figure 9:
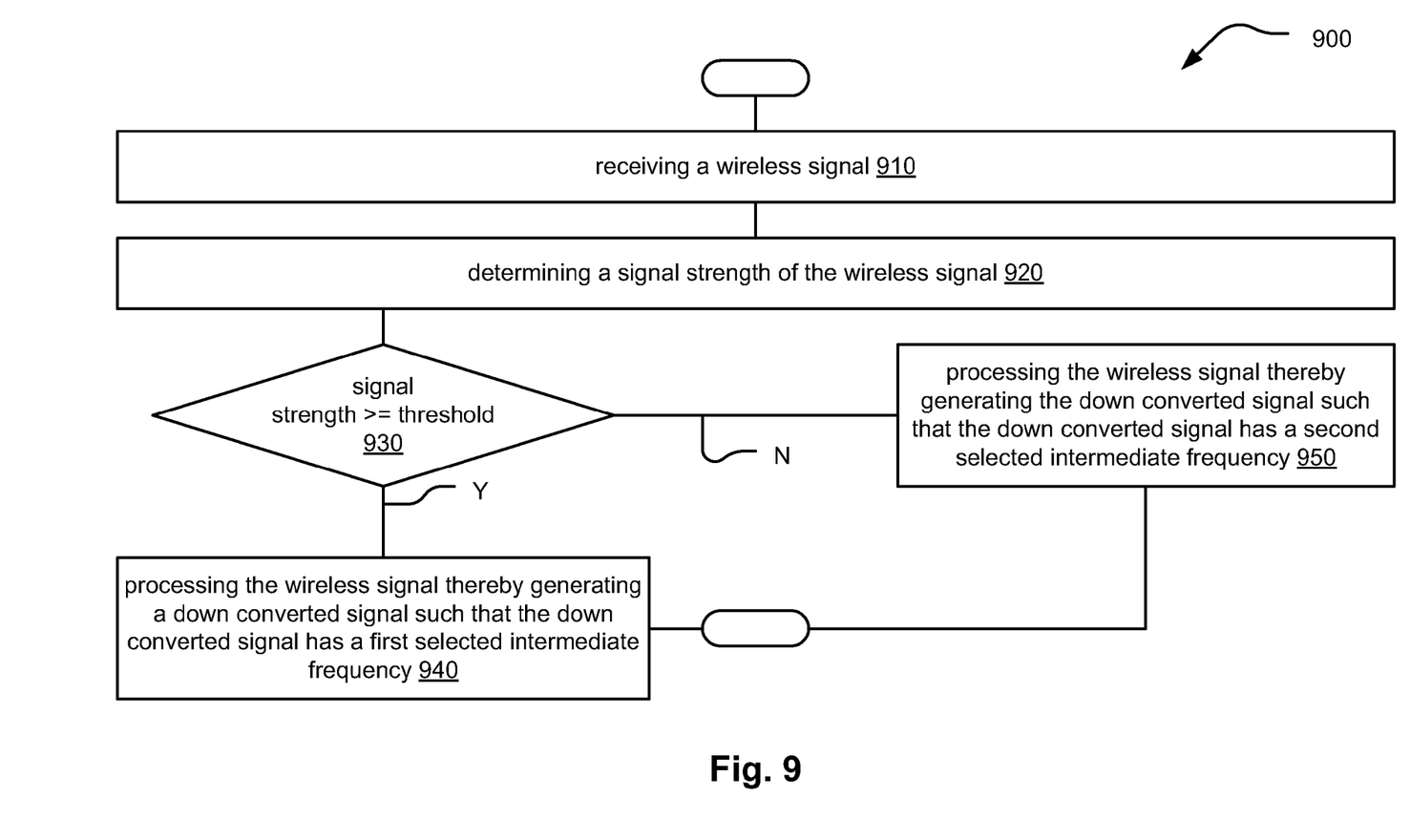
FIG. 9 is a diagram illustrating an embodiment of a method for performing receiver processing.

FIG. 9 is a diagram illustrating an embodiment of a method 900 for performing receiver processing.

The method 900 begins by receiving a wireless signal, as shown in a block 910. The method 900 continues by determining a signal strength of the wireless signal, as shown in a block 920. As shown in a decision block 930, the method 900 operates by determining whether the signal strength is above or equal to a threshold. When the signal strength of the wireless signal is above or equal to a threshold, the method 900 continues by processing the wireless signal thereby generating a down converted signal such that the down converted signal has a first selected intermediate frequency, as shown in a block 940.

When the signal strength of the wireless signal is less than the threshold, the method 900 continues by processing the wireless signal thereby generating the down converted signal such that the down converted signal has a second selected intermediate frequency, as shown in a block 950.

It is noted that the various modules (e.g., modules such as processing modules, digital BB receiver or transmitter processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication device, comprising:
an input for receiving a wireless signal;
a processing module implemented for determining a signal strength of the wireless signal; and
a down conversion module implemented for processing the wireless signal thereby generating a down converted signal such that the down converted signal has a selected intermediate frequency; and wherein:
the selected intermediate frequency of the down converted signal selected based on the signal strength of the wireless signal.

2. The communication device of claim 1, wherein:
the selected intermediate frequency is a first selected intermediate frequency;
the down converted signal is a first down converted signal;
the wireless signal is a first wireless signal that is received during a first time;
the input for receiving a second wireless signal during a second time;
during a first time, the down conversion module for processing the first wireless signal thereby generating the first down converted signal having the first selected intermediate frequency; and
during a second time, the down conversion module for processing the second wireless signal thereby generating a second down converted signal having a second selected intermediate frequency.

3. The communication device of claim 1, wherein:
the selected intermediate frequency is a first selected intermediate frequency;
the down conversion module is implemented for processing the wireless signal thereby generating a down converted signal having either the first selected intermediate frequency or a second selected intermediate frequency; and
the down conversion module is implemented for performing down conversion only to either the first selected intermediate frequency or the second selected intermediate frequency.

4. The communication device of claim 1, wherein:
the selected intermediate frequency is one intermediate frequency of a plurality of intermediate frequencies to which the wireless signal may be down converted; and
the selected intermediate frequency selected from among the plurality of intermediate frequencies based on the signal strength of the wireless signal.

5. The communication device of claim 1, wherein:
the selected intermediate frequency is one intermediate frequency of a plurality of intermediate frequencies to which the wireless signal may be down converted;
the selected intermediate frequency has a relatively higher frequency compared to at least one other intermediate frequency of the plurality of intermediate frequencies; and
the selected intermediate frequency selected to reduce at least one of flicker noise, DC offset, and second order non-linearity within the down converted signal.

6. The communication device of claim 1, wherein:
the selected intermediate frequency is one intermediate frequency of a plurality of intermediate frequencies;
the selected intermediate frequency has a relatively lower frequency compared to at least one other intermediate frequency of the plurality of intermediate frequencies; and
the selected intermediate frequency selected for effectuating image rejection within the down converted signal.

7. The communication device of claim 1, wherein:
the down converted signal includes a signal component located at the selected intermediate frequency; and
the down converted signal includes an image component located at a negative of the selected intermediate frequency.

8. The communication device of claim 1, wherein:
the down converted signal includes a signal component located at the selected intermediate frequency; and
the down converted signal includes an image component located at twice the selected intermediate frequency.

9. The communication device of claim 1, wherein:
when the signal strength of the wireless signal is above or equal to −90 dBm, the selected intermediate frequency is a first intermediate frequency; and
when the signal strength of the wireless signal is below −90 dBm, the selected intermediate frequency is a second intermediate frequency.

10. The communication device of claim 1, wherein:
the communication device is a handheld wireless communication device.

11. A communication device, comprising:
an input for receiving a wireless signal;
a processing module implemented for determining a signal strength of the wireless signal; and
a down conversion module implemented for:
when the signal strength of the wireless signal is above or equal to a threshold, processing the wireless signal thereby generating a down converted signal such that the down converted signal has a first selected intermediate frequency; and
when the signal strength of the wireless signal is less than the threshold, processing the wireless signal thereby generating the down converted signal such that the down converted signal has a second selected intermediate frequency; and wherein:
at least one of the first selected intermediate frequency and the second selected intermediate frequency of the down converted signal selected based on the signal strength of the wireless signal;
the first selected intermediate frequency and the second selected intermediate frequency are intermediate frequencies of a plurality of intermediate frequencies;
the first selected intermediate frequency has a relative lower frequency compared to at least one other intermediate frequency of the plurality of intermediate frequencies; and the first selected intermediate frequency selected for effectuating image rejection within the down converted signal.

12. The communication device of claim 11, wherein:
the down converted signal includes a signal component located at either the first selected intermediate frequency or the second selected intermediate frequency; and
the down converted signal includes an image component located at a negative of either the first selected intermediate frequency or the second selected intermediate frequency.

13. The communication device of claim 11, wherein:
the down converted signal includes a signal component located at either the first selected intermediate frequency or the second selected intermediate frequency; and
the down converted signal includes an image component located at either twice the first selected intermediate frequency or twice the second selected intermediate frequency.

14. The communication device of claim 11, wherein:
the threshold is −90 dBm.

15. The communication device of claim 11, wherein:
the communication device is a handheld wireless communication device.

16. A method for performing receiver processing, the method comprising:
receiving a wireless signal;
determining a signal strength of the wireless signal;
when the signal strength of the wireless signal is above or equal to a threshold, processing the wireless signal thereby generating a down converted signal such that the down converted signal has a first selected intermediate frequency;
when the signal strength of the wireless signal is less than the threshold, processing the wireless signal thereby generating the down converted signal such that the down converted signal has a second selected intermediate frequency; and
selecting the first selected intermediate frequency for effectuating image rejection within the down converted signal.

17. The method of claim 16, wherein:
the down converted signal includes a signal component located at either the first selected intermediate frequency or the second selected intermediate frequency; and
the down converted signal includes an image component located at a negative of either the first selected intermediate frequency or the second selected intermediate frequency.

18. The method of claim 16, wherein:
the down converted signal includes a signal component located at either the first selected intermediate frequency or the second selected intermediate frequency; and
the down converted signal includes an image component located at either twice the first selected intermediate frequency or twice the second selected intermediate frequency.

19. The method of claim 16, wherein:
the threshold is −90 dBm.

20. The method of claim 16, wherein:
the method is performed within a communication device; and
the communication device is a handheld wireless communication device.

* * * * *